(12) United States Patent
Park et al.

(10) Patent No.: US 7,616,565 B2
(45) Date of Patent: Nov. 10, 2009

(54) NETWORK COMMUNICATION SCHEDULING

(75) Inventors: Sung Park, Irvine, CA (US); Daniel R. Cormier, Anaheim, CA (US); Tracy V. Cramer, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 456 days.

(21) Appl. No.: 11/678,668

(22) Filed: Feb. 26, 2007

(65) Prior Publication Data

US 2008/0205431 A1    Aug. 28, 2008

(51) Int. Cl.
- *H04B 7/212* (2006.01)
- *H04W 4/00* (2009.01)
- *H04J 3/12* (2006.01)

(52) U.S. Cl. ............ 370/230; 370/337; 370/338; 370/347

(58) Field of Classification Search ............ None
See application file for complete search history.

(56) References Cited

U.S. PATENT DOCUMENTS

| | | | |
|---|---|---|---|
| 6,901,064 B2 * | 5/2005 | Cain et al. | 370/337 |
| 7,062,687 B1 | 6/2006 | Gfeller | |
| 7,502,360 B2 * | 3/2009 | Liu et al. | 370/348 |
| 2003/0067892 A1 | 4/2003 | Beyer et al. | |
| 2006/0268879 A1 | 11/2006 | Xhafa et al. | |
| 2007/0019594 A1 * | 1/2007 | Perumal et al. | 370/338 |
| 2008/0089398 A1 | 4/2008 | Cormier et al. | |
| 2008/0205431 A1 | 8/2008 | Park et al. | |
| 2009/0052406 A1 | 2/2009 | Park et al. | |
| 2009/0086752 A1 | 4/2009 | Anderson et al. | |

FOREIGN PATENT DOCUMENTS

| | | |
|---|---|---|
| KR | 2002 0055285 | 7/2002 |
| WO | WO 0048367 A2 | 8/2000 |
| WO | WO 0048367 A3 | 8/2000 |
| WO | WO 0128170 A2 | 4/2001 |
| WO | WO 0128170 A3 | 4/2001 |
| WO | WO 01/28170 A | 1/2002 |
| WO | WO 03/090083 A1 | 10/2003 |
| WO | WO 2009/046143 A2 | 4/2009 |

OTHER PUBLICATIONS

Lichun Bao, et al. "Channel Access Scheduling in Ad Hoc Networks with Unidirectional Links", Computer Science Dept. and Computer Engineering Dept., University of CA, 2001.

Daniel L. Cormier, et al., "Determining A Mode To Transmit Data", U.S. Appl. No. 11/548,763, filed Oct. 12, 2006.

(Continued)

*Primary Examiner*—Chi H Pham
*Assistant Examiner*—Soon-Dong D Hyun
(74) *Attorney, Agent, or Firm*—Daly, Crowley, Mofford & Durkee, LLP

(57) ABSTRACT

A method to schedule network communications includes determining nodes within a network, forming a node list based on the nodes in the network, determining a network schedule of communications for the nodes based on the node list. Determining a network schedule includes determining a timeslot. Each node receives data during the timeslot.

29 Claims, 7 Drawing Sheets

OTHER PUBLICATIONS

Lichun Bao, et al., "Hybrid Channel Access Scheduling in Ad Hoc Networks", Computer Science Dept. and Computer Engineering Dept., University of CA, 2002.

Notification of Transmittal of the International Search Report and the Written Opinion of the International Searching Authority, or the Declaration, PCT/US2008/077331 dated Jan. 28, 2009.

International Search Report (Form PCT/ISA/210) and Written Opinion of the International Searching Authority (Form PCT/ISA/237), for PCT/US2008/051276, Aug. 18, 2008, 9 pages.

Notification of Transmittal of the International Search Report and the Written Opinion of the International Searching Authority, or the Declaration dated Dec. 4, 2008, PCT/US2008/071407.

Lichun Bao: "MALS: multiple access scheduling based on Latin squares" Military Communications Conference, 2004. MILCOM 2004. 2004 IEEE Monterey, CA, USA Oct. 31-Nov. 3, 2004, Piscataway, NJ, USA, IEEE vol. 1, Oct. 31, 2004, pp. 315-321, XP010827102 ISBN: 987-0-7803-8847-5 whole document, in particular p. 320, left column, $2^{nd}$ and $3^{rd}$ paragraph.

Lichun Bao et al: "Hybrid channel access scheduling in ad hoc networks" Network Protocols, 2002. Proceedings. $10^{th}$ IEEE International Conference on Nov. 12-15, 2002 Piscataway, NJ, USA, IEEE, Nov. 12, 2002, pp. 46-57, XP010632566 ISBN: 978-0-7695-1856-5, abstract, chapter 3.1.

International Search Report PCT/US2008078501 dated Apr. 28, 2009, 1 page.

Vaidya et al, "Distributed Fair Scheduling in a Wireless LAN", IEEE Trans. On Mobile Computing, vol. 4, No. 6, (Nov. 2005), pp. 616-629.

Shiann-Tsong et al., "A Bandwidth Allocation/Sharing/Extension Protocol for Multimedia Over IEEE 802.11 *Ad Hoc* Wireless LANs", IEEE Journal on Selected Areas in Communication, vol. 19, No. 10, (Oct. 2001), pp. 2065-2080.

Qi et al, "Ad hoc QoS on-demand routing (AQOR) in mobile ad hoc networks," Journal of Parallel and Distributed Computing 63, (2003), pp. 154-165.

Arthur Anderson, et al., "Method For Increasing The Successful Outcomes Of A Fair Coin Flip Using A Node Weight Metric In A Communication System", U.S. Appl. No. 60/976,730, filed Oct. 1, 2007, 11 pages.

Sung I. Park et al., "Multicasting in a Network Using Neighbor Information", U.S. Appl. No. 61/089,135, filed Aug. 15, 2008 50 pages.

Sung I. Park et al., "Multicasting in a Network Using Neighbor Information", U.S. Appl. No. 12/508,747, filed Jul. 24, 2009 43 pages.

Lichun Bao, et al. "Channel Access Scheduling in Ad Hoc Networks with Unidirectional Links", Computer Science Dept. and Computer Engineering Dept., University of CA, Santa Cruz, CA, 10 pages, 2001.

* cited by examiner

|  | Timeslot 1 | Timeslot 2 | Timeslot 3 | Timeslot 4 |
|---|---|---|---|---|
| Node 12a | Receive | Receive | Receive | Receive |
| Node 12b | Transmit | Receive | Receive | Receive |
| Node 12c | Receive | Receive | Transmit | Receive |
| Node 12d | Receive | Transmit | Receive | Receive |
| Node 12e | Receive | Receive | Receive | Transmit |

| | Timeslot 1 | Timeslot 2 | Timeslot 3 | Timeslot 4 |
|---|---|---|---|---|
| Node 12a | Receive | Receive | Receive | Receive |
| Node 12b | Transmit | Receive | Receive | Receive |
| Node 12c | Receive | Receive | Receive | Receive |
| Node 12d | Receive | Transmit | Receive | Receive |
| Node 12e | Receive | Receive | Receive | Transmit |

| | Timeslot 1 | Timeslot 2 | Timeslot 3 | Timeslot 4 |
|---|---|---|---|---|
| Node 12a | Receive | Receive | VSLOT | Receive |
| Node 12b | Transmit | Receive | VSLOT | Receive |
| Node 12c | Receive | Receive | VSLOT | Receive |
| Node 12d | Receive | Transmit | VSLOT | Receive |
| Node 12e | Receive | Receive | VSLOT | Transmit |
| Node 12f | VSLOT | Tramsmit | Transmit | VSLOT |

|  | Timeslot 1 | Timeslot 2 | Timeslot 3 | Timeslot 4 |
|---|---|---|---|---|
| Node 12a | Receive | Receive | VSLOT | Receive |
| Node 12b | Transmit | Receive | VSLOT | Receive |
| Node 12c | Receive | Receive | VSLOT | Receive |
| Node 12d | Receive | Transmit | VSLOT | Receive |
| Node 12e | Receive | Receive | VSLOT | Transmit |
| Node 12f | Receive | Receive | Transmit | VSLOT |
| Node 12g | Receive | Transmit | Receive | VSLOT |
| Node 12h | Transmit | Receive | Receive | VSLOT |

NETWORK COMMUNICATION SCHEDULING

TECHNICAL FIELD

The invention relates to scheduling network communications.

BACKGROUND

In a shared network with multiple users sharing the same frequency, it is desirable to have only one user transmit data at a time. For example, if one user transmits data at the same time another user is transmitting data, collisions occur and data is generally corrupted and lost. One method to reduce collisions in the shared networks is to use time division multiple access (TDMA). TDMA enables several users to share the same frequency by dividing the use of the shared frequency into different timeslots, one user per timeslot. For example, the users transmit data in succession (i.e., one user transmit data after another user transmits data), each user using its own timeslot, so that only one user transmits data during a timeslot.

SUMMARY

In one aspect, the invention is a method to schedule network communications includes determining nodes within a network, forming a node list based on the nodes in the network, determining a network schedule of communications for the nodes based on the node list. Determining a network schedule includes determining a timeslot. Each node receives data during the timeslot.

In another aspect, the invention is an article that includes a machine-readable medium that stores executable instructions to schedule network communications. The instructions cause a machine to determine nodes within a network, form a node list based on the nodes in the network and determine a network schedule of communications for the nodes based on the node list. The instructions causing a machine to determine a network schedule include instructions causing a machine to determine a timeslot. Each node receives data during the timeslot.

In a further aspect, the invention is an apparatus to schedule network communications. The apparatus includes circuitry to determine nodes within a network, to form a node list based on the nodes in the network and to determine a network schedule of communications for the nodes based on the node list. The circuitry to determine a network schedule includes circuitry to determine a timeslot. Each node receives data during the timeslot.

DETAILED DESCRIPTION

Figures 1, 2:
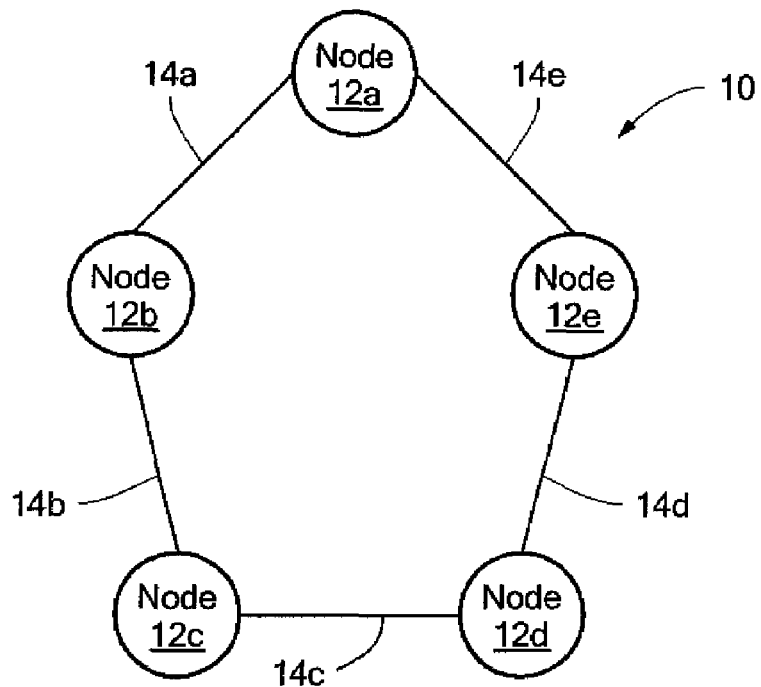
FIG. 1 is a prior art diagram of a communication network having nodes.
FIG. 2 is a prior art table indicating an example of network schedule of communications between the nodes of FIG. 1.

Referring to FIG. 1, a communications network 10 includes nodes (e.g., a first node 12a, a second node 12b, a third node 12c, a fourth node 12d and a fifth node 12e). In one example, the nodes 12a-12e are network routers. In another example, the nodes 12a-12e are wireless radios. The nodes 12a-12e are connected by links representing that the two nodes are within transmit/receive range of each other (e.g., a first link 14a connecting the first node 12a to the second node 12b, a second link 14b connecting the second node 12b to the third node 12c, a third link 14c connecting the third node 12c to the fourth node 12d, a fourth link 14d connecting the fourth node 12d to the fifth node 12e, and a fifth link 14e connecting the fifth node 12e to the first node 12a).

In one example, the links 14a-14e are wireless links. In another example, the links 14a-14e are wired links. In another example, links 14a-14e may be a combination of wireless and wired links. The communications network 10 may be any shared medium.

The first node 12a and the second node 12b are one hop away from each other (i.e., one-hop neighbors). One hop means that the shortest network path from the first node 12a to the second node 12b does not include any intervening nodes (i.e., one link). Likewise the second node 12b and the third node 12c; the third node 12c and the fourth node 12d; the fourth node 12d and the fifth node 12e; and the fifth node 12e and the first node 12a are all one-hop neighbors to each other.

The first node 12a and the third node 12c are two hops away from each other (i.e., two-hop neighbors). Two hops means that the shortest network path from the first node 12a to the third node 12c includes only one intervening node (the second node 12b) (i.e., two links). Likewise the second node 12b and the fourth node 12d; the third node 12c and the fifth node 12e; the fourth node 12d and the first node 12a; and the fifth node 12e and the second node 12b are all two-hop neighbors to each other.

A goal of network communications scheduling is to ensure that only one network node communicates at a time. If one node transmits data at the same time another node is transmitting data, collisions, which corrupts the data, will occur at a receiving node which is in range of both transmitting nodes. One way used in the prior art to reduce collisions is to use time division multiplexing access (TDMA). One particular implementation of TDMA uses a Node Activation Multiple Access (NAMA) algorithm. NAMA is a wireless multiple access protocol designed to generate dynamic and collision-free TDMA timeslot scheduling. NAMA achieves collision-free TDMA timeslot scheduling by having nodes within one and two hops of each other participate in a cooperative random election process. Each node generates the same random algorithm to determine simultaneously which node transmits data for a particular timeslot.

For example, referring back to FIG. 1, the nodes 12a-12e implement an election process for four timeslots (e.g., timeslot 1, timeslot 2, timeslot 3 and timeslot 4). During each timeslot, each node 12a-12e in the network 10 determines a set of pseudo-random numbers based on each node's ID for those nodes that are within one or two hops distance. The assumption is that each node is aware of all other nodes (e.g., has the node ID of the other nodes) within a two-hop neighborhood. Since each node is using the same pseudo random number generation function to determine the random numbers, each node will come up with a consistent random value for each of the nodes within the two-hop neighborhood. Once a set of values is computed, the node with the highest value transmits during the timeslot.

In one particular example of determining random values, in timeslot 1, the first node 12a is determined to have a value of 4, the second node 12b is determined to have a value of 8, the third node 12c is determined to have a value of 1, the fourth node 12d is determined to have a value of 7 and the fifth node 12e is determined to have a value of 3. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4, the fourth node 12d is determined to have a value of 9 and the fifth node 12e is determined to have a value of 7. Since the fourth node 12d has the highest value, the fourth node is the only node that transmits during time slot 2.

In timeslot 3, the first node 12a is determined to have a value of 2, the second node 12b is determined to have a value of 1, the third node 12c is determined to have a value of 6, the fourth node 12d is determined to have a value of 3 and the fifth node 12e is determined to have a value of 5. Since the third node 12c has the highest value, the third node is the only node that transmits during time slot 3.

In timeslot 4, the first node 12a is determined to have a value of 4, the second node 12b is determined to have a value of 5, the third node 12c is determined to have a value of 2, the fourth node 12d is determined to have a value of 7 and the fifth node 12e is determined to have a value of 8. Since the fifth node 12e has the highest value, the fifth node is the only node that transmits during time slot 2.

FIG. 2 includes a table 20 indicating a transmit schedule for the nodes during the four timeslots in the preceding example. The resulting schedule from the election process achieves a collision-free schedule by allowing only one node to transmit (within one- or two-hop neighbors) during each timeslot.

Figure 3:
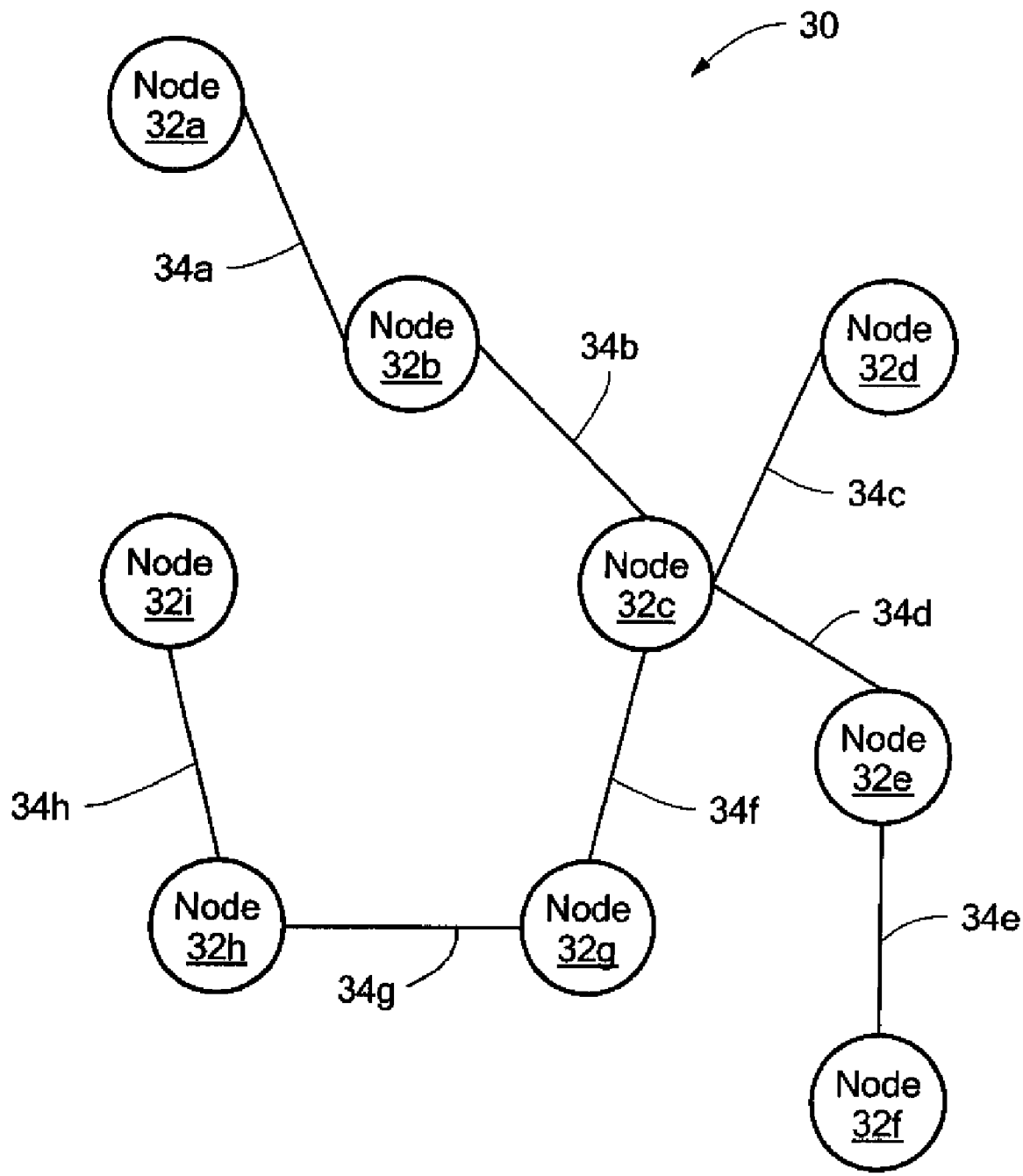
FIG. 3 is a prior art diagram of another communications network.

However, even using the NAMA technique, collisions may still occur if nodes are unaware of the other nodes. For example, referring to FIG. 3, a communications network 30 includes nodes (e.g., a first node 32a, a second node 32b, a third node 32c, a fourth node 32d, a fifth node 32e, a sixth node 32f, a seventh node 32g, an eighth node 32h and a ninth node 32i). The nodes 32a-32i are connected by links (e.g., a first link 34a connecting the first node 32a to the second node 32b; a second link 34b connecting the second node 32b to the third node 32c; a third link 34c connecting the third node 32c to the fourth node 32d; a fourth link 34d connecting the fourth node 32d to the fifth node 32e; a fifth link 34e connecting the fifth node 32e to the sixth node 32f; a sixth link 34f connecting the third node 32c to the seventh node 32g; the seventh link 34g connecting the seventh node 32g to the eighth node 32h; and the eighth link 34h connecting the eighth node 32h to the ninth node 32i).

In this example, the third node 32c has a neighborhood list (e.g., one-hop and two-hop neighbors) that includes the first node 32a, the second node 32b, the fourth node 32d, the fifth node 32e, the sixth node 32f, the seventh node 32g and the eighth node 32h. The ninth node 32i is not in the neighborhood list of the third node 32c because the eighth node is more than two hops away from the third node. The sixth node 32f only includes the fifth node 32e on its neighbor list, in this example. The sixth node 32f is missing the third node 32c (a two-hop neighbor) in its neighbor list. The sixth node 32f has view of the network topology that is inconsistent with the true topology of the network where the third node 32c and the sixth node 32f are two-hop neighbors.

Due to this inconsistency of the sixth node 32f not having the correct network topology, collisions can occur. In particular, using the NAMA technique, each node 32a-32i determines and evaluates the output of a random number function. For example, the first node 32a is determined to have a value of 4, the second node 32b is determined to have a value of 5, the third node 32c is determined to have a value of 9, the fourth node 32d is determined to have a value of 2, the fifth node 32e is determined to have a value of 6, the sixth node 32f is determined to have a value of 7, the seventh node 32g is determined to have a value of 2, the eighth node 32h is determined to have a value of 1 and the ninth node 32i is determined to have value of 8. The sixth node 32f determines that it can transmit during the timeslot since it has the highest output among its two-hop neighbors which only includes the fifth node 32e. Since the third node 32c also determines that it can transmit during the timeslot, the transmission from the third node 32c collides with a transmission from the sixth node 32f at the fifth node 32e.

It is therefore desirable in NAMA scheduling for each node to have a consistent view of the network in order to guarantee collision-free schedules. In contrast to prior art approaches, the description below focuses on an approach to improve network scheduling.

In a dynamic network, a consistency may be achieved by constantly exchanging control information among one-hop neighbors. The control information used in establishing consistency in NAMA scheduling includes at least the node ID of the originator and the node IDs of all the one-hop neighbors of the originator. Upon receiving control information, each node can build up a comprehensive list of neighbors using the node ID of the originator (which becomes one-hop neighbors of the receiver) and node IDs of the one-hop neighbors (which become two-hop neighbors of the receiver).

A virtual timeslot (VSLOT) technique improves consistency. The VSLOT technique offers a mechanism through which two nodes that may not share a consistent network topology view can reconcile the difference by listening to each other's neighbor information through timeslots referred to as "virtual timeslots." Unlike the prior art, in the VSLOT technique, the NAMA scheduling is used in scheduling control timeslots. Control timeslots are timeslots in which control information is sent.

One advantage of using the technique of NAMA scheduling for control timeslots comes from the more efficient utilization of the bandwidth since there will be at least one node scheduled to transmit for each timeslot but in the original timeslot many timeslots can go unused. For example, the prior approach is to allocate a group of slots (called a signal section) for exchanging network topology information (or simply neighbor information). Each node in the network randomly picks a slot within each signal section to transmit neighbor information. For each node to have an acceptable probability of transmitting its neighbor information collision-free, the algorithm requires pre-allocation of a large signal section (up to 200 slots for 25 node networks). There are several major problems with the prior approach. First, the approach requires a prior knowledge of the theoretical maximum network size in order to allocate a large enough signal section. For networks smaller than the maximum size, slot access is highly inefficient. For networks of greater size, network performance suffers as the probability of collisions increase. Second, since the algorithm utilizes only one slot per node out of the total allocated signal section, the majority of slots in the signal section go unused, even when the network size reaches the assumed maximum. Thirds, the approach does not exploit the fact that over time a portion of the nodes in the network will reach consistency and be able to schedule neighbor information using the NAMA scheduling rather than randomly picking slots.

Figures 4, 5:
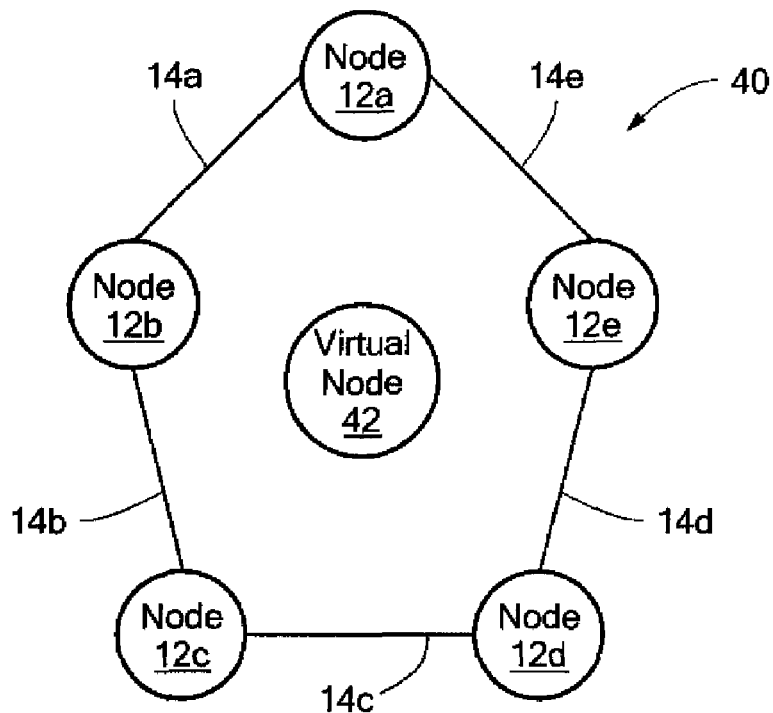
FIG. 4 is a diagram of a communications network having a virtual node.
FIG. 5 is a table indicating an example of network schedule of communications between the nodes of FIG. 4.

The election process using the VSLOT technique is illustrated in FIG. 4. Applying the NAMA scheduling, the network topology shown in FIG. 4 will be reflected in each node's neighbor list where all five nodes 12a-12e will belong to the list of either one- or two-hop neighbors of every other node. In addition to its normal NAMA neighbor list, in the VSLOT technique, each node has a virtual node 42 as its one-hop neighbor. The virtual node 42 is an imaginary node that does not exist in the network 40 but only exists in the neighbor list (e.g., a table) of each node and used for the purpose of scheduling the virtual timeslots. In one example, a virtual node 42 may be any type of information that is "a priori" shared by each node 12a-12e participating in NAMA scheduling such that each node can converge on a timeslot(s) during which all nodes that are participating in the scheduling stay in a receive mode if the neighbor information is consistent.

Having included the virtual node 42 in its neighbor list, each node 12a-12e determines the output of the pseudo-random function for all one/two-hop neighbors along with the virtual node during each timeslot. If a virtual node is elected for a timeslot (a virtual timeslot (VSLOT)), all of the neighboring nodes that are within one and two hops will be in the receive mode during that virtual timeslot. For nodes that have reached topology consistency, the virtual timeslot will be consistent among all the participating nodes.

Referring to FIG. 5, the NAMA technique may be used to generate random numbers associated with each node 12a-12e and the virtual node 42. For example, in timeslot 1, the first node 12a is determined to have a value of 4, the second node 12b is determined to have a value of 8, the third node 12c is determined to have a value of 1, the fourth node 12d is determined to have a value of 7, the fifth node 12e is determined to have a value of 3 and the virtual node 42 is determined to have a value of 5. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4, the fourth node 12d is determined to have a value of 9, the fifth node 12e is determined to have a value of 7 and the virtual node 42 is determined to have a value of 1. Since the fourth node 12d has the highest value, the fourth node is the only node that transmits during timeslot 2.

In timeslot 3, the first node 12a is determined to have a value of 2, the second node 12b is determined to have a value of 1, the third node 12c is determined to have a value of 6, the fourth node 12d is determined to have a value of 3, the fifth node 12e is determined to have a value of 5 and the virtual node 42 is determined to have a value of 8. Since the virtual node has the highest value, no node transmits during time slot 3. The timeslot 3 becomes the virtual timeslot (VSLOT) where each node 12a-12f is in the receive mode.

In timeslot 4, the first node 12a is determined to have a value of 4, the second node 12b is determined to have a value of 5, the third node 12c is determined to have a value of 2, the fourth node 12d is determined to have a value of 7, the fifth node 12e is determined to have a value of 8 and the virtual node 42 is determined to have a value of 6. Since the fifth node 12e has the highest value, the fifth node is the only node that transmits during timeslot 4.

NAMA scheduling requires consistency in the network topology view among the participating nodes for the scheduling to work correctly. For a node that is newly joining the network (e.g., a node recently powered up, a node belonging to another network connecting to the network), if the new node immediately participated in NAMA scheduling, the new node will persistently disrupt the ongoing data exchange of the nodes established in the network since the new node will never have an opportunity to learn the presence of other nodes in the vicinity. For example, for a new node that is just powered on, in its view, there is only one node, which is itself, in the network. Using NAMA scheduling on control timeslots, the new node schedules itself to transmit neighbor information for all the allocated control timeslots thus preventing it from hearing the control information of other nodes that may be present in the range (e.g., wireless) of the new node. In order for the new node to break out of this scheduling mode (where it schedules itself all the time), there needs to be opportunities for the new node to receive control information of other nodes in the vicinity as well as for the neighboring nodes to learn of the presence of newly joining node. The VSLOT technique provides these opportunities (or timeslots) by employing the notion of a virtual node to schedule receive-only timeslots called "virtual timeslots" (VSLOT).

The VSLOT technique uses the inherent characteristics of NAMA scheduling where inconsistency in topology information will result in inconsistent NAMA schedules. When there is inconsistency in the schedule, a virtual timeslot of one node will overlap with control information transmission of another node creating the opportunity for each node to reconcile the inconsistency. However, for nodes that have inconsistent topology information (e.g., newly joining node), the virtual timeslot of one node will be different than that of other nodes with different topology information. A virtual timeslot of one node will overlap with a control information transmission of another node that has inconsistent topology information, giving each node an opportunity to reconcile the difference. Thus, when there is inconsistency in topology information, virtual timeslots become opportunities for the nodes in the network to learn of new nodes that may not share the same topology information.

Figures 6, 7:
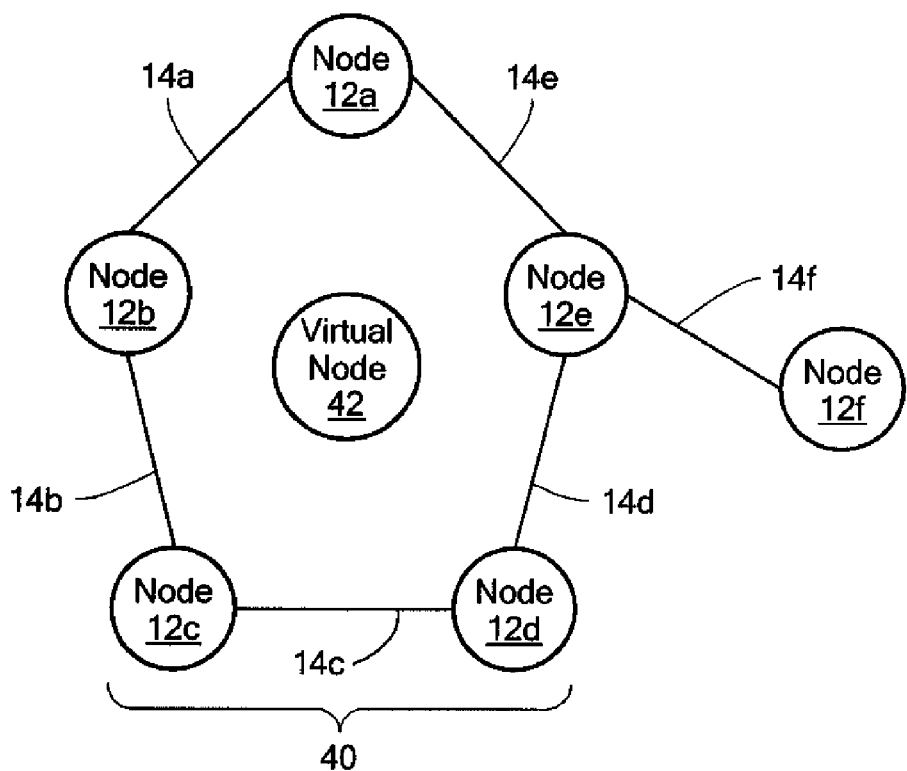
FIG. 6 is another diagram of a communications network having a virtual node.
FIG. 7 is a table indicating an example of initial network schedule of communications between the nodes of FIG. 6.

The exchange of the control information that occurs during virtual timeslots is shown in FIG. 6. In FIG. 6, an existing network 40 includes nodes 12a-12e and is joined by a new node, a sixth node 12f that has no knowledge of any neighboring nodes. The sixth node 12f schedules its control timeslots by including itself and the virtual node 42 for the NAMA election process.

An initial schedule of the timeslots 60 is reflected in FIG. 7. According to the initial schedule 60, the sixth node includes a virtual timeslot location in timeslot 1 and in timeslot 4 that is inconsistent from that of nodes 12a-12e which include a virtual timeslot location in timeslot 3. The inconsistency occurs because the sixth node 12f does not share the same network topology information as the nodes 12a-12e. This inconsistency causes the virtual timeslot (timeslot 3) for the fifth node 12e to overlap with the control information transmission from the sixth node 12f. Because of the overlap, the sixth node 12f will be able to listen to the control information transmitted by the fifth node 12e during the virtual timeslots (timeslot 1 and timeslot 4) of the sixth node 12f. Likewise, the fifth node 12e will also be able to listen to the transmission of the sixth node 12f during the virtual timeslot (timeslot 3) of the fifth node 12e. Having received each other's control information, each node 12a-12f will be able to come to a consistent schedule in which case the sixth node 12f will be a part of network 40.

Figures 8, 9:
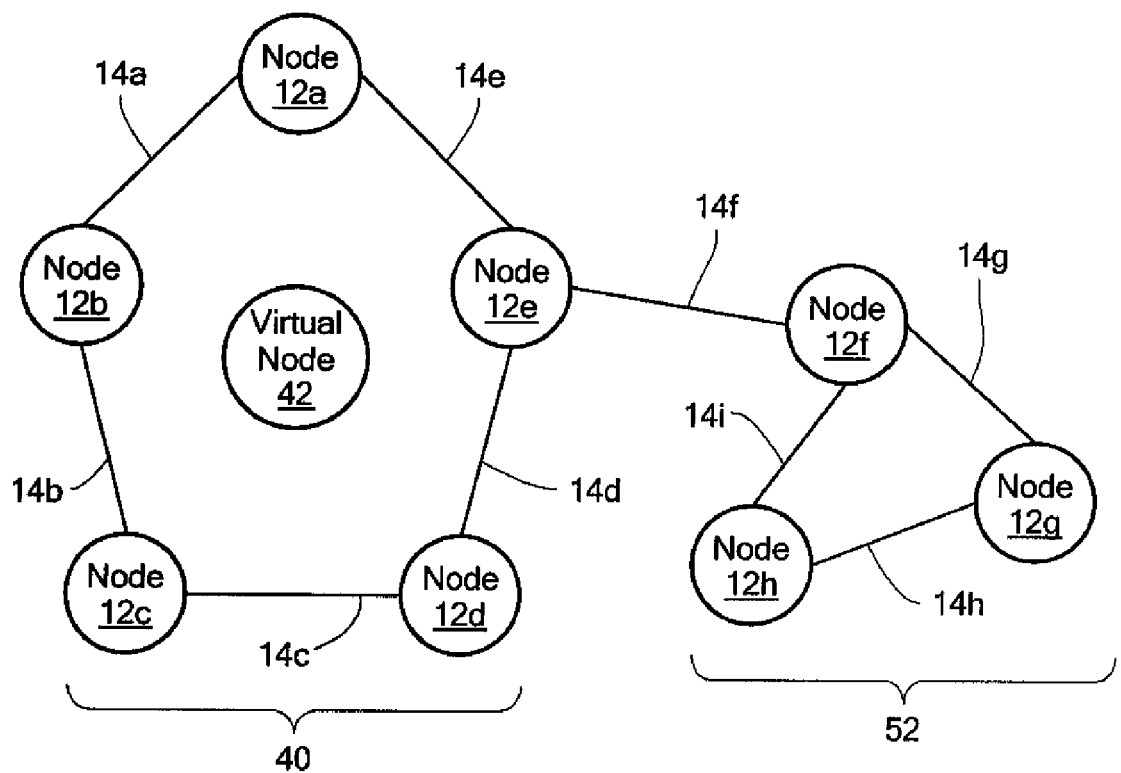
FIG. 8 is a further diagram of a communications network having a virtual node.
FIG. 9 is a table indicating an example of initial network schedule of communications between the nodes of FIG. 8.

Referring to FIG. 8, in another example, a network merge of a network 52 including a sixth node 12f, the seventh node 12g and the eighth node 12h with the network 40 goes through the similar mechanism as in the example shown in FIG. 6. When the network 40 and the network 52 come into range (e.g., wireless) of each other, much of their control information transmission will result in collisions since the existing schedules have been formulated without regard for the other network (see, for example, an initial schedule 70 in FIG. 9). The inconsistency in each network's network topology view will cause the virtual timeslots for the fifth node 12e and the sixth node 12f to overlap with one another's control information transmission. The overlap will allow each network 40, 52 to eventually learn the presence of each other. Having received the control information from each other, the two networks 40 and 52 can merge and generate consistent schedules that fully incorporate the merged networks.

Figure 10:
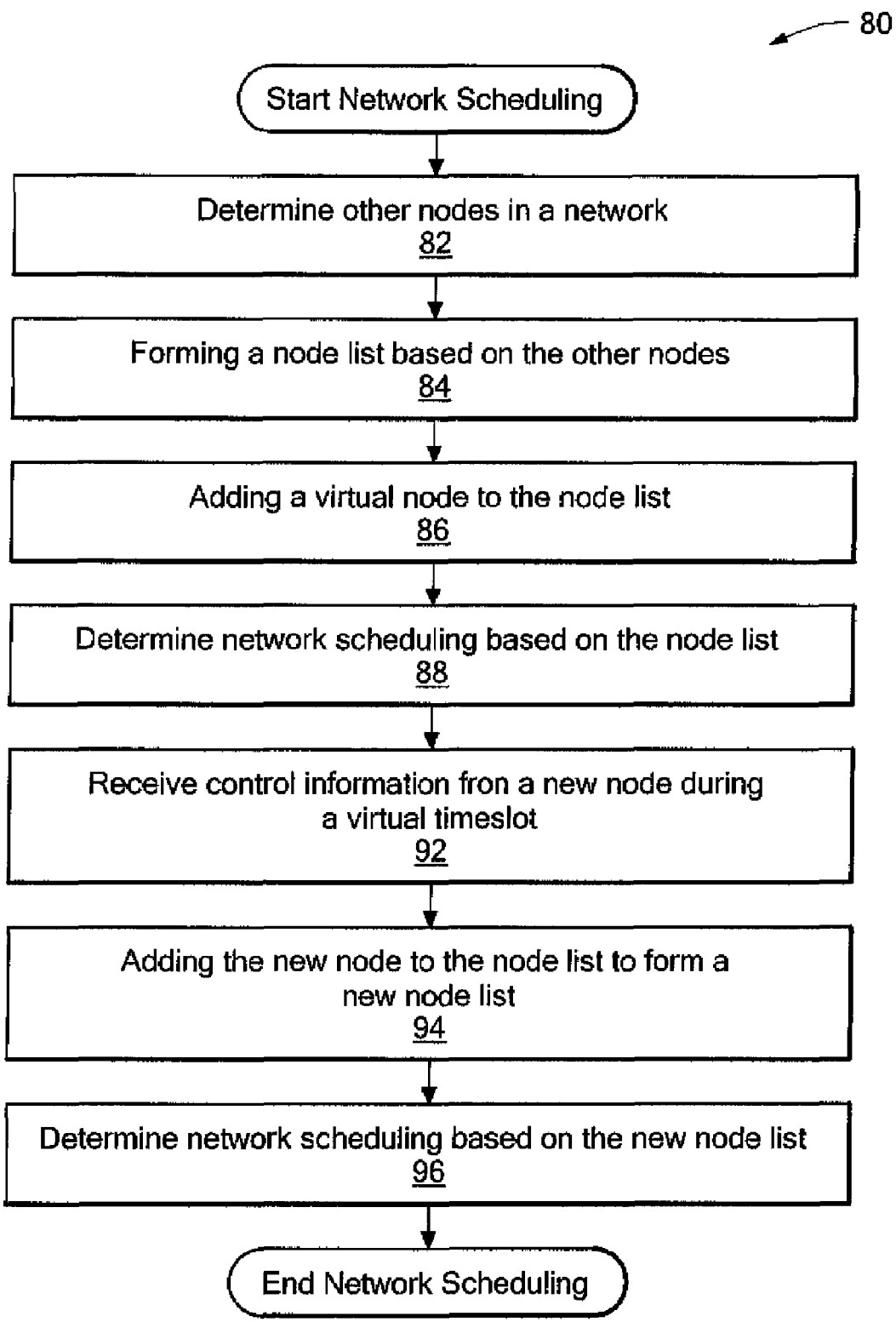
FIG. 10 is a flowchart of an example of a process to schedule network communications.

FIG. 10 depicts a flowchart for a process 80 which is an example of a process for network scheduling. In one example, each node 12a-12e performs process 80. Process 80 includes determining other nodes in a network (82). In one example, determining nodes includes determining one-hop neighbors. In another example, determining nodes includes determining one-hop and two-hop neighbors. Other examples may include determining greater than two-hop neighbors.

Process 80 forms a node list based on the other nodes (84) and adds a field associated with a virtual field (86). In one example, the node list is included in one or more lists (not shown). In another example, the node list is included in one or more tables (not shown). Process 80 determines network scheduling based on values stored in the node list (88). In one example, the values may be node IDs. In one example, the network scheduling is determined using the NAMA technique. In another example, the network scheduling is determined using a random number function with the Node IDs as a seed for the random number function. In one example, the processing block 88 determines the virtual timeslot (VLSOT) for which each of the nodes are in a receive mode.

Process 80 receives control information from a new node during the virtual timeslot (VLSOT) (92). Process 80 adds the new node to the node list to form a new node list (94). Process 80 determines network scheduling based on the new node list (96).

Figure 11:
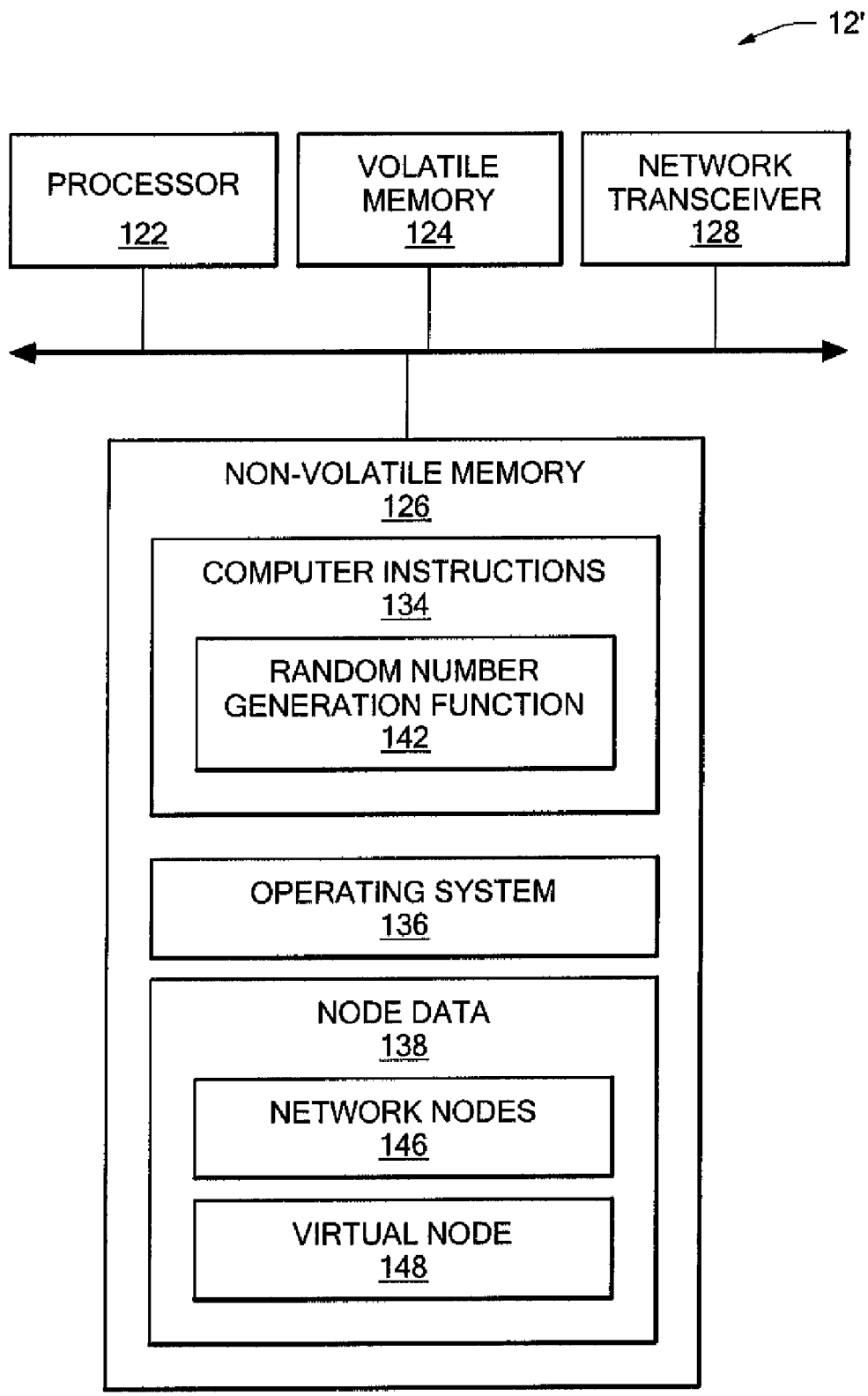
FIG. 11 is a block diagram of an example of a network node on which the process of FIG. 10 may be implemented.

Referring to FIG. 11, one or more of the nodes 12a-12e may be configured as a network node 12', for example. The network node 12' includes a processor 122, a volatile memory 124, a non-volatile memory 126 (e.g., hard disk) and a network transceiver 128. The non-volatile memory 126 stores computer instructions 134, an operating system 136 and node data 138. The computer instructions 134 include a random number generation function 142. The node data 138 includes network nodes data 146 and virtual node data 148. In one example, the node data 138 and the virtual node data 148 are stored in a list (not shown). In another example, the node data 138 and the virtual node data 148 are stored in tables (not shown). The transceiver 128 is used to communicate with the other network nodes. In one example, the computer instructions 134 are executed by the processor 122 out of volatile memory 124 to perform process 80.

Process 80 is not limited to use with the hardware and software of FIG. 11; it may find applicability in any computing or processing environment and with any type of machine or set of machines that is capable of running a computer program. Process 80 may be implemented in hardware, software, or a combination of the two. Process 80 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 80 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 80. Process 80 may also be implemented as a machine-readable storage medium, configured with a computer program, where upon execution, instructions in the computer program cause the computer to operate in accordance with process 80.

The processes described herein are not limited to the specific embodiments described herein. For example, determining the virtual timeslot does not necessarily require a virtual node. In another example, the process 80 is not limited to the specific processing order of FIG. 10, respectively. Rather, any of the processing blocks of FIG. 10 may be re-ordered, combined or removed, performed in parallel or in serial, as necessary, to achieve the results set forth above.

The processing blocks in FIG. 10 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method to schedule network communications comprising:

determining nodes within a network using a processor at a node;

forming a node list based on the nodes in the network;

adding a virtual node to the node list; and determining a network schedule of communications for the nodes based on the node list, wherein determining the network schedule comprises determining a timeslot from which each node receives data.

2. The method of claim 1 wherein the virtual node is a one-hop neighbor of each node.

3. The method of claim 1, further comprising:

receiving control data from a new node during the timeslot; and forming a new node list based on the nodes and the new node.

4. The method of claim 3, further comprising determining a new network schedule of communications for the nodes and the new node based on the new node list.

5. The method of claim 3, further comprising determining one-hop neighbors to the new node.

6. The method of claim 1 wherein determining the network schedule comprises using a Node Activation Multiple Access (NAMA) algorithm.

7. The method of claim 1 wherein determining the network schedule comprises generating random numbers based on the node list.

8. The method of claim 1 wherein forming a node list comprises adding nodes that are one-hop neighbors.

9. The method of claim 8 wherein forming a node list comprises assigning a node identification (ID) for each node.

10. An article comprising a machine-readable medium that stores executable instructions to schedule network communications, the instructions causing a machine to:

determine nodes within a network;

form a node list based on the nodes in the network;

to add a virtual node to the node list; and determine a network schedule of communications for the nodes based on the node list, wherein the instructions causing the machine to determine the network schedule comprises instructions causing the machine to determine a timeslot from which each node receives data.

11. The article of claim 10 wherein the virtual node is a one-hop neighbor of each node.

12. The article of claim 10, further comprising instructions causing the machine to:

receive control data from a new node during the timeslot; and form a new node list based on the nodes and the new node.

13. The article of claim 12, further comprising instructions causing the machine to determine a new network schedule of communications for the nodes and the new node based on the new node list.

14. The article of claim 12, further comprising instructions causing the machine to determine one-hop neighbors to the new node.

15. The article of claim 10 wherein instructions causing the machine to determine the network schedule comprises instructions causing the machine to generate random numbers based on the node list.

16. The article of claim 10 wherein instructions causing the machine to form a node list comprises instructions causing the machine to add nodes that are one-hop neighbors.

17. The article of claim 16 wherein instructions causing the machine to form a node list comprises instructions causing the machine to assign a node identification (ID) for each node.

18. An apparatus to schedule network communications, comprising:

circuitry to:

determine nodes within a network;

form a node list based on the nodes in the network;

add a virtual node to the node list, the virtual node being a one-hop neighbor of each node; and determine a network schedule of communications for the nodes based on the node list;

receive control data from a new node during a timeslot;

form a new node list based on the nodes and the new node;

determine a new network schedule of communications for the nodes and the new node based on the new node list, wherein the circuitry to determine the network schedule comprises circuitry to determine the timeslot from which each node receives data.

19. The apparatus of claim 18 wherein the circuitry comprises at least one of a processor, a memory, programmable logic and logic gates.

20. The apparatus of claim 18, further comprising circuitry to determine one-hop neighbors to the new node.

21. The apparatus of claim 18 wherein the circuitry to determine the network schedule comprises circuitry to generate random numbers based on the node list.

22. The apparatus of claim 18 wherein the circuitry to form a node list comprises circuitry to add nodes that are one-hop neighbors.

23. The apparatus of claim 22 wherein the circuitry to form the node list comprises circuitry to assign a node identification (ID) for each node.

24. A method to schedule network communications comprising:

determining nodes within a network using a processor at a node;

forming a node list based on the nodes in the network;

determining a network schedule of communications for the nodes based on the node list;

receiving control data from a new node during a timeslot; and forming a new node list based on the nodes and the new node, wherein determining the network schedule comprises determining the timeslot from which each node receives data.

25. The method of claim 24, further comprising determining a new network schedule of communications for the nodes and the new node based on the new node list.

26. The method of claim 24, further comprising determining one-hop neighbors to the new node.

27. The method of claim 24 wherein determining the network schedule comprises using a Node Activation Multiple Access (NAMA) algorithm.

28. The method of claim 24 wherein determining the network schedule comprises generating random numbers based on the node list.

29. The method of claim 24 wherein forming a node list comprises:

adding nodes that are one-hop neighbors; and forming a node list comprises assigning a node identification (ID) for each node.

* * * * *

UNITED STATES PATENT AND TRADEMARK OFFICE
CERTIFICATE OF CORRECTION

PATENT NO. : 7,616,565 B2  Page 1 of 1
APPLICATION NO. : 11/678668
DATED : November 10, 2009
INVENTOR(S) : Park et al.

It is certified that error appears in the above-identified patent and that said Letters Patent is hereby corrected as shown below:

Col. 1, line 21, delete "transmit" and replace with --transmits--.

Col. 1, line 28, delete "includes" and replace with --including--.

Col. 1, line 57, delete "of network" and replace with --of a network--.

Col. 1, line 64, delete "of network" and replace with --of a network--.

Col. 2, line 1, delete "of initial" and replace with --of an initial--.

Col. 2, line 5, delete "of initial" and replace with --of an initial--.

Col. 3, line 26, delete "time slot" and replace with --timeslot--.

Col. 3, line 33, delete "time slot" and replace with --timeslot--.

Col. 3, line 40, delete "time slot" and replace with --timeslot--.

Col. 4, line 64, delete "networks." and replace with --networks).--.

Col. 5, line 7, delete ". Thirds," and replace with --. Third,--.

Col. 6, line 27, delete "node." and replace with --nodes.--.

Col. 7, line 58, delete "nodes data 146" and replace with --nodes 146--.

Signed and Sealed this

Twelfth Day of January, 2010

David J. Kappos
*Director of the United States Patent and Trademark Office*